Sept. 16, 1958     J. S. LOGAN     2,852,015
SKIN DIVER'S SPEAR GUN
Filed Jan. 31, 1956
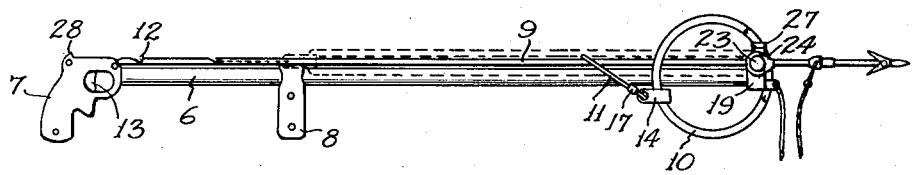
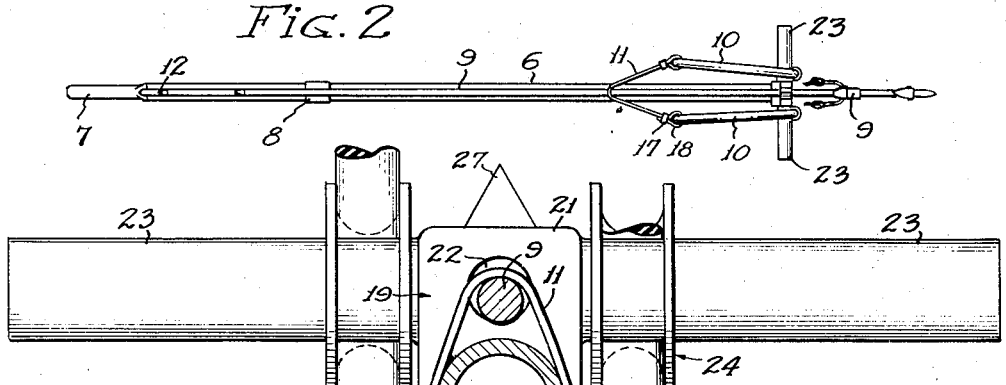
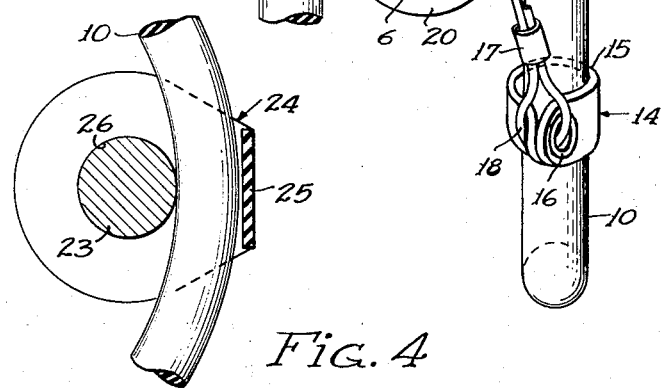
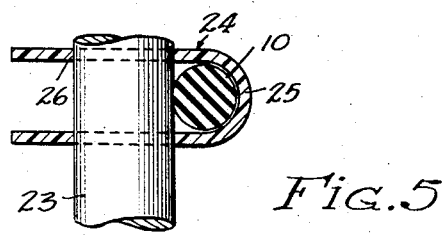
INVENTOR.
JOHN S. LOGAN
BY
Lynn H Latta
—ATTORNEY—

United States Patent Office 2,852,015
Patented Sept. 16, 1958

2,852,015

SKIN DIVER'S SPEAR GUN

John S. Logan, Santa Monica, Calif.

Application January 31, 1956, Serial No. 562,424

6 Claims. (Cl. 124—22)

This invention relates to spear guns of the type commonly used by skin divers in the underwater fishing sport. The general object of the invention is to provide improvements in the catapult mechanism for propelling a spear of such a gun.

In conventional spear guns now now on the market, two or more tension elements consisting in linear sections of stretchable elastic tendon are utilized, their respective ends being secured by band clamps or by wrappings to anchorages at the forward end of the gun and to a yoke which engages in a notch in the spear, the yoke joined by the two tendons constituting the catapult mechanism. Such band clamp or wrapped connections have a deteriorating effect on the clamped or wrapped ends of the rubber tendon, the compressive confinement of the rubber restraining it from movement, having a deteriorating action on the molecular structure of the rubber while the free, active sections of the tendons retain their life and usefulness for a much longer period of time, in accordance with the known characteristics of live rubber (active use preserves the life of the rubber and lengthens it).

With the foregoing problem in mind, a specific object of this invention is to provide a spear gun embodying catapult mechanism of the rubber tendon type having a greatly extended active life as contrasted to the conventional mechanism referred to above.

The invention further deals with the problem of loading the gun, an operation which calls for the development of high tensile loading of the rubber tendons. A common method is to steady the gun stock against the chest, so as to restrain it against the pull of the tendons, while the hands grasp the catapult to stretch the tendons and slip the catapult yoke into a notch in the spear which has previously been hooked to the trigger operated release mechanism of the gun.

A further object of the invention is to provide a spear gun having means providing for the use of the operator's feet and knees to restrain and steady the gun shaft while the hands are used for stretching the tendons and attaching the catapult yoke to the spear.

A still further object is to provide a spear gun especially adapted to utilize multiple catapult units in various numbers selected in accordance with the extent of power desired for a particular operation, and embodying an arrangement which makes it possible to effect the change to more or fewer of the catapult units, very simply, easily and quickly.

Other objects will become apparent in the ensuing specifications and claims in connection with the accompanying drawing, wherein:

Figure 1 is a side view of the gun showing, in full lines, the catapult tendons relaxed and, in broken lines, the tendons in loaded condition.

Figure 2 is a plan view of the gun in unloaded condition.

Figure 3 is a cross-sectional view taken through the gun barrel looking forwardly.

Figure 4 is a cross-sectional view taken through the tendon binding in a plane parallel to the barrel.

Figure 5 is a cross-sectional view taken centrally through the binding in the plane of the axis of the pedal bar.

Referring now to the drawing in detail, I have shown therein, as an example of one form in which the invention may be embodied, a spear gun embodying a barrel 6, a pistol grip 7 of conventional form secured to the rear end of barrel 6, a steadying grip 8 secured on barrel 6 forwardly of grip 7, a spear 9, a pair of catapult tendons 10 for propelling spear 9 forwardly from the gun, and a yoke 11 for connecting the tendons 10 to the spear 9 by hooking the yoke into one of a plurality of notches 12 in the spear 9 near the rear end thereof.

Pistol grip 7 includes a trigger 13 which cooperates with a latch element (not shown) for engaging a notch or hook in the rear end of spear 9 to hold it against the pull of tendons 10 until released by squeezing the trigger.

The present invention provides, in the tendons 10, an improved energizing mechanism in that the tendons are in the form of closed loops or bands, and are loosely linked to their anchorages and to sling saddle 11, respectively, in a manner such that every portion of each tendon is subjected to a proportionate share of the alternate stretching and relaxing operations incident to the use of the gun, whereby the tendons are uniformly preserved and are not subjected to accelerated deterioration at any particular point. Furthermore, the invention provides an arrangement wherein the tendons will be automatically subjected to a certain amount of rotation (i. e. circumferential shifting in their anchorages and saddle connections) such that no part of a tendon will tend to take a set in a small radius bend such as occurs at each end of a tendon when it is in a stretched condition.

The connection between the tendons 10 and the yoke 11 is provided by a pair of ties 14, each having a web portion 15 looped around a respective tendon 10 and respective end portions provided with aligned apertures suitably reinforced as by grommets 16, through which a respective end of yoke 11 is looped (forming a loop 18). The yoke 11 may be a length of wire or nylon cord or any equivalent material. A small band clamp 17 is constricted around the end of the loop 18 on the respective end of yoke 11 and around the adjoining section of yoke 11, to secure the loop 18. It may now be noted that yoke 11 extends across the gun axis, above spear 9, so that it may be caught in a notch 12, and that its respective ends are loosely looped to the respective tendons 10 (when the tendons are relaxed) by means of the ties 14 in which the tendons may freely shift circumferentially when relaxed. Similar free binding means (shortly to be described) are utilized to attach the tendons to a fitting on the forward end of the gun barrel. The vibration resulting from the snapping of the tendons to relaxed positions in the firing of the gun will inevitably result in some circumferential shifting of the tendons each time the gun is discharged, thus minimizing any tendency for the tendons to take a set in elongated form and tending to preserve them in unstressed circular ring form as shown in Figure 1. Maximum useful life is, therefore, attained.

Secured to the forward end of gun barrel 6 is the fitting 19, including a semi-cylindrical socket section 20 in which a forward end of barrel 6 is secured in any suitable manner. Fitting 19 also includes a head 21 having a guide or bearing bore 22 extending therethrough directly above barrel 6 and parallel thereto. Spear 9 passes through bore 22 when the gun is loaded, and is guided thereby when the gun is discharged. Head 21 is formed with a front sight 27 which cooperates conventionally with a rear sight 28 on pistol grip 7.

Projecting diametrically from opposite sides of fitting 19 are a pair of pedal bars 23, which may be formed integrally with fitting 19 or may be separate bars threaded, or otherwise, securely anchored in the fitting 19. In cocking the gun, the operator places the barrel 6 (or pistol grip 8) between his knees, places the pedal bars 23 below his feet (as by cradling them in the arches of his feet), grasps the tendons 10 in his respective hands (as by looping his fingers through the spaces circumscribed by the tendons) and then stretches the tendons rearwardly, sliding the yoke 11 against the spear 9 until it slips into a notch 12.

Tendons 10 are anchored to the gun shaft through the medium of bindings 24, each including a central web portion forming a loop 25 around a respective tendon at its forward extremity, and a pair of end portions each having a circular aperture 26 of the proper diameter to receive a respective pedal bar 23. The bindings 24, after being looped around the respective tendons 10, are slipped over the respective bars 23 in order to attach the tendons to the gun. They may as easily be removed by slipping the bindings 24 off the ends of the bars 23. Alternatively, additional tendons can be installed by slipping the bindings thereof onto bars 23 outwardly of the bindings 24. In such case, the yoke 11 of one pair of tendons may be engaged in one of the notches 12 and the yoke 11 of the other pair of tendons may be engaged in another of the notches 12, and the loading operation may proceed in two stages, one pair of tendons being stretched in one stage and the other pair of tendons being stretched in the second stage. Obviously, the use of two sets of tendons is resorted to when an increase of power for spearing an unusually large fish may be desired.

The bindings 24 provide for attaching the tendons to the bars 23 in a secure manner (such that the tendons cannot escape from the bars) and yet in a loose manner such that the tendons can slip circumferentially in the bindings as hereinbefore specified. Furthermore, the tendons are attached to the bars in a manner such that they are looped around the bars and bear directly against the bars so as to be securely anchored to the gun barrel when loaded.

The pistol grips 7 and 7 and the release mechanism embodied therein are of conventional construction and in themselves form no part of the present invention.

The foregoing description, and the particular embodiment of the invention described therein and shown in the accompanying drawing, are merely for the purpose of illustration and are not intended to restrict the invention to the precise details of construction therein illustrated, the scope of the invention being set forth and defined in the following claims which are intended to embrace all mechanical equivalents of the illustrated structure.

I claim:

1. In a skin diver's spear gun: a barrel; a fitting attached to the forward end of said barrel, said fitting having a guide aperture therein above the level of said barrel; a grip attached to said barrel near its rear end, said grip having means ti engage the rear end of a spear extended through said guide aperture; a pair of catapult tendons of stretchable elastic material, said tendons being of circular ring form when unstressed; means below the level of said guide aperture for anchoring said tendons to the forward end of said barrel, said anchoring means having rounded, smooth bearing surfaces around which the tendons extend without sharp bends therein; a yoke for attaching the tendons to said spear in stressed condition; and means attaching the respective ends of said yoke to said tendons; said anchoring and attaching means including loops loosely encircling said tendons at substantially diametrically opposed points thereon, so as to leave the tendons free to shift circumferentially when unloaded.

2. In a skin diver's spear gun: a barrel; a fitting attached to the forward end of said barrel, said fitting having a guide aperture therein above the level of said barrel; a grip attached to said barrel near its rear end, said grip having means to engage the rear end of a spear extended through said guide aperture; a pair of catapult tendons of stretchable elastic material, said tendons being of circular ring form when unstressed; a pair of pedal bars secured in said fitting and extending diametrically laterally from the forward end of said barrel and through the respective tendons below the level of said guide aperture, said pedal bars having rounded, smooth surfaces bearing against the inner surfaces of forward portions of said tendons and preventing sharp bends therein; binding means secured to said pedal bars and looped loosely around said forward tendon portions and attaching them to said pedal bars; a yoke for attaching the tendons to the spear in stressed condition; and a pair of ties secured to respective ends of said yoke and each looped around the rear portion of a respective tendon to provide the attachment of said yoke to said tendons.

3. A spear gun as defined in claim 2, wherein said fitting includes a socket receiving and secured to the forward end of said barrel.

4. In a skin diver's spear gun, a barrel; a pistol grip secured to the rear end of said barrel and having means to engage the rear end of a spear; a spear having a notch near its rear end; a fitting including a lower portion secured to the forward end of said barrel and a head portion projecting upwardly from the barrel and provided with a bearing aperture to receive said spear and guide it during projection thereof; a pair of rounded section pedal bars anchored to said head portion of the fitting and projecting diametrically from opposite sides thereof for engagement by an operator's feet; a pair of catapult tendons of stretchable elastic material and of circular ring form when unstressed, each including a forward portion bearing against a forward surface of a respective pedal bar below the level of said guide aperture for anchorage, said pedal bars having smooth rounded forward bearing surfaces preventing sharp bends in said tendons; bindings secured to said pedal bars and looped loosely around said forward tendon portions to attach the tendons to the pedal bars; a yoke receivable in said spear notch; and a pair of ties each secured to a respective end of said yoke and looped loosely around a rear portion of a respective tendon, said bindings and ties encircling said tendons loosely so as to leave the tendons free to shift circumferentially when unstressed.

5. A spear gun as defined in claim 4, wherein each binding is of flexible sheet material and comprises a pair of eye portions through which a respective pedal bar is snugly received, and a web portion bridging said eye portions and providing the loop which encircles the tendon.

6. A spear gun as defined in claim 4, wherein said pedal bars are disposed on a common axis intersecting the path of movement of the spear as guided by its guide apparatus.

References Cited in the file of this patent

UNITED STATES PATENTS

| 1,581,626 | Barth | Apr. 20, 1926 |
| 1,877,215 | Albisu | Sept. 13, 1932 |
| 1,866,926 | Colby | July 12, 1932 |

FOREIGN PATENTS

| 841,891 | France | Feb. 20, 1939 |
| 157,206 | Australia | June 23, 1954 |